W. R. DUNTON.
Motors for Sewing-Machines.

No. 134,526. Patented Jan. 7, 1873.

Witnesses
A. D. Laffre M.D.
Geo. H. Cook

Inventor
Warren R. Dunton

2 Sheets--Sheet 2.

W. R. DUNTON.
Motors for Sewing-Machines.

No. 134,526. Patented Jan. 7, 1873.

Witnesses
A. DeLoffre M D
Geo. H. Cook

Inventor
Warren R. Dunton

UNITED STATES PATENT OFFICE.

WARREN R. DUNTON, OF UNITED STATES ARMY.

IMPROVEMENT IN MOTORS FOR SEWING-MACHINES.

Specification forming part of Letters Patent No. 134,526, dated January 7, 1873.

*To all whom it may concern:*

Be it known that I, Lieutenant WARREN R. DUNTON, of the United States Army, residing at Baton Rouge Barracks, in Baton Rouge, parish of East Baton Rouge, and State of Louisiana, have invented a new and useful Improvement in Motive-Power Attachments for Sewing-Machines, which is adapted for application to all table sewing-machines; and I do hereby declare that the following is a clear, full, and exact description of the same, reference being had to the annexed drawing making a part of this specification, in which—

Figure 1:
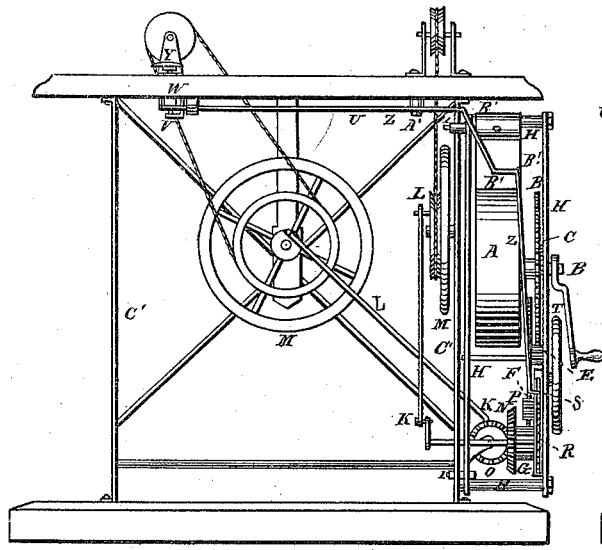
Figure 2:
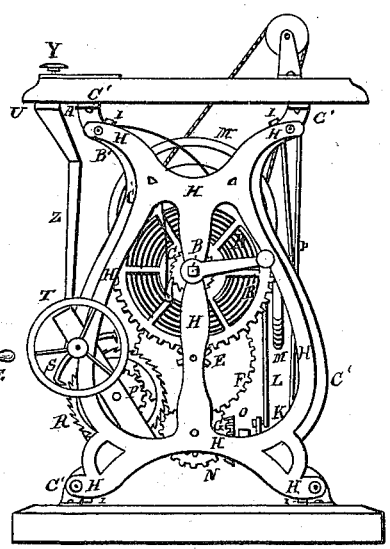
Figure 3:
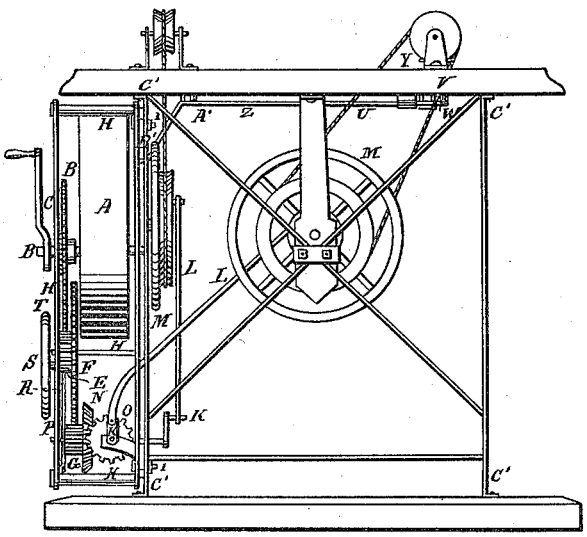
Figure 4:
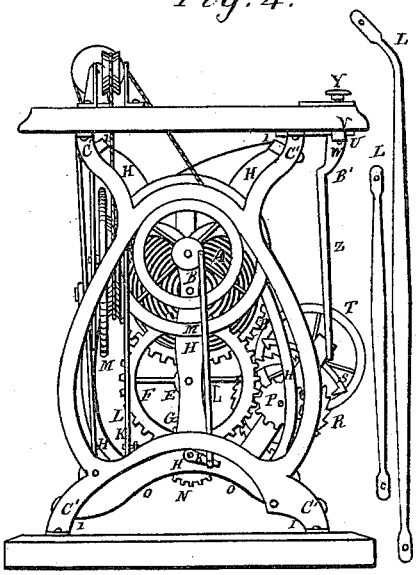
Figure 5:
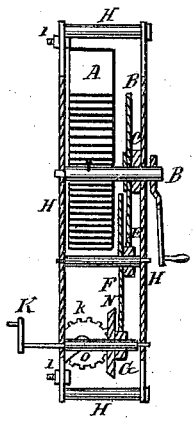
Figure 6:
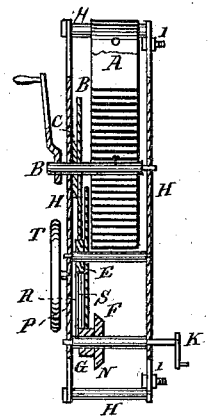
Figure 7:
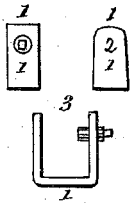
Figure 14:
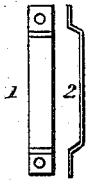
Figure 8:
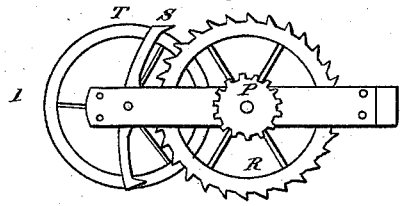
Figure 9:
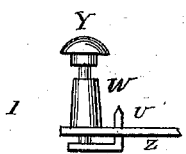
Figure 10:
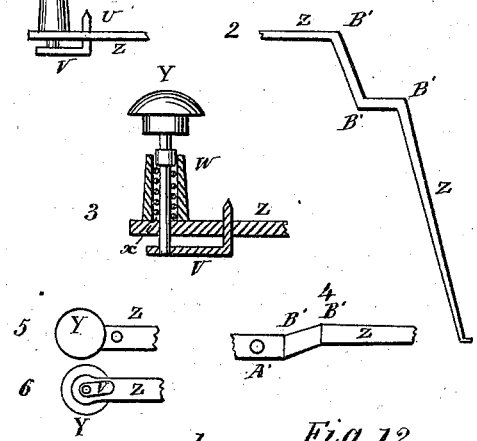
Figure 10:
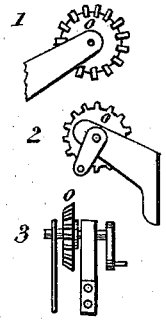
Figure 11:
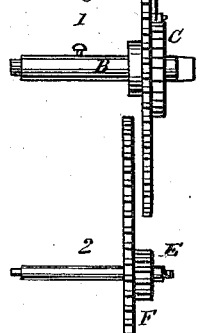
Figure 12:
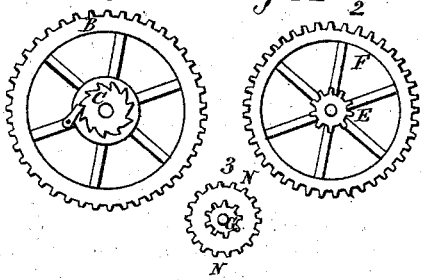
Figure 13:
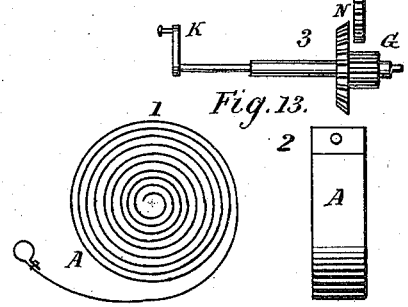

Figure 1 is a front elevation; Fig. 2, an end elevation, (right side;) Fig. 3, a rear elevation; Fig. 4, an end elevation, (left side;) Figs. 5 and 6, transverse sections of the attachment; Fig. 7, clamps for fastening the attachment to frames of machines, (three views;) Fig. 8, controlling or regulating device, (two views;) Fig. 9, stopping and starting device, (six views;) Fig. 10, appliance for imparting motion to machines with the driving-wheel parallel to front of table, (three views;) Fig. 11, geared wheels and shafts, (three views;) Fig. 12, geared wheels, (three views;) Fig. 13, coiled spring for motive power, (two views;) Fig. 14, stay for stopping and starting device, (two views.)

The nature of my invention consists in the application of a coiled-steel spring of suitable strength to propel a sewing-machine, the invention of which, and application of, as a motive power I hereby disclaim. Said spring, marked A, is placed upon a shaft with a geared wheel, B, provided with a ratchet-wheel and pawl C, for winding up, by means of a detachable crank, and connected with other geared-wheels E F G, the whole being inclosed in a frame, H, of suitable size and shape to contain the spring A and gearing B C E F G, and so constructed as to be readily attached to the frame-work C' of sewing-machines by the metallic clamps I, and then by cranks, marked K, and connecting-rods L attached to the driving-wheels M; there being a set of bevel-geared wheels, marked N O, attached to the lower shaft for the purpose of imparting motion to those machines which are propelled by a driving-wheel placed parallel to the front of the table; there being, also, a controller or regulator, Fig. 8, propelled by means of a small geared wheel, marked P, meshing into the geared wheel F, which turns a ratchet-wheel, R, working in connection with a curved double pawl, S, which is attached to a balance-wheel, T, and a stopping and starting device, marked U, attached to the table of the machine on the under side, as at V, with pin passing through a curved slot in the table, said pin passing through the main bar and being attached to a pointed pin which rests upon the under side of the table, to hold it in position either when the brake is off or on—said main pin passing through a collar marked, W, inclosing a spiral spring, X, and terminating in a broad, flat head, Y, for convenience in handling. To this device is attached a long-armed lever, Z, fastened at the point marked A', and then bending downward as at B', and working, when closed, against the curved double pawl S, in such a manner as to close it firmly into the ratchet-wheel R and hold it firmly in place.

To enable others skilled in the art to make and use my invention, I will proceed to describe its construction and operation.

I construct my improvement in motive-power attachments for sewing-machines in such manner as to be applicable to any sewing-machine that is propelled by a "treadle" or foot power, by means of the frame-work H, made of suitable strength, size, and shape so as to be adapted to the different forms of sewing-machines, to which it is firmly attached by metallic clamps I, carrying each in one side a set-screw for the purpose of fastening to the frame-work of the machines; said frame-work for the attachment being fitted to receive the following-named parts, consisting of a coiled-steel spring fitted to a shaft by the ordinary device of a headed stud, and fastened at the other end to one of the upper standards or braces supporting the two sides of the frames. Upon the shaft bearing the spring is fitted a loose geared wheel running against a ratchet-wheel, which is fitted tight upon the shaft. Upon this side of the main geared-wheel is fitted a spring and pawl that works upon the ratchet-wheel for holding the spring wound up. This main geared wheel meshes into a small geared wheel placed below and fitted by the side of another large geared wheel which turns between the main geared wheel and spring. This second large geared-wheel meshes into another small geared wheel upon the lower shaft, to the end of which is fitted a crank, with the pin therein at the same distance from the center of the shaft as the wrist-pin is fastened in the core of the driving-wheel of the machine: this provided the machine is propelled by a driver running at right angles to the front of the table upon which the sewing device is attached. For the purpose of propelling those machines whose drivers are placed parallel to the front of the table, I place upon the lower shaft, against the small geared wheel, a beveled-gear wheel which meshes into another beveled-geared wheel set at a right angle to the one on the main lower shaft, by means of two arms screwed to the frame of the attachment on the inner side; this smaller geared wheel running between the two arms, and bearing on the end of the shaft a crank, with the pin set the same distance from the center of the shaft as the wrist is placed from the center of the driving-wheel, this crank being attached to the wrist by a connecting-rod bent at its lower end so as to clear in its strokes the frame-works of the machine and attachment.

For the purpose of controlling the speed of the machine, and to obtain approximate regular motion, I place upon the outer part of the frame-work of the attachment, and upon its inner side, leaning at an angle to the front, a smaller frame, bearing on its outer surface a small geared wheel, which meshes into the large geared wheel upon the middle shaft of the attachment. This small geared wheel is attached to a shaft, which carries a ratchet-wheel between the two plates which constitute the frame for the controlling device. Over the upper side of this ratchet-wheel is placed a curved double pawl, in such position and with the ends bent at such angles as to enter and catch alternately between the teeth in the ratchet-wheel; the shaft upon which this double pawl is placed bearing upon its outer end, and at sufficient distance from the side, a balance or fly-wheel, this wheel making partial revolutions either way upon the outside of the frame of the attachment, and thus maintaining an almost even speed either when the attachment is fully wound up or nearly run down.

For the purpose of stopping the attachment and machine I construct a long lever, at one end of which is attached a tubular collar, through which, as well as the main lever-bar, passes a bolt or pin, having its upper end turned flat and broad to serve as a head for an easy and convenient means of moving the same. At its entrance to the collar or tube it is fitted to slide in the interior of the tube, and then turned enough smaller to allow a spiral-wire spring to work between it and the inside of the tube, the pin passing then through a hole in the main lever-bar, enough smaller to allow the pin to work freely and still hold the spring in place, allowing a quick return of the head to its greatest elevation when pressure is removed.

To the lower end of this pin is attached a piece of metal at right angles to the pin and running along parallel to the main lever-bar to another hole, through which another pin or rod works at right angles to the bar and parallel to the main pin or rod passing through the tube, this second pin being pointed to take firm hold of the wood of the table against which it rests. Under this main bar is put a metal plate, bent at either end so as to allow free motion back and forth of the bar and resist pressure from above. The main lever-bar is made of suitable length to be put upon a machine with the stud or head nearly in front of the needle bar or arm by means of a curved slot cut through the table, in which the tube or collar traverses, this slot being covered by a thin metal plate, with slot cut to fit the stem or pin, and also curved. This lever is pierced, also, at a proper distance from the "lock end" for a screw to fasten it to the table, and then is bent downward and diagonally across the attachment in such a manner as to, when thrown or put on by a pulling of the stud or head toward the front of the table, allow the lower end of the lever to press the outer end of the curved double pawl into the teeth of the ratchet-wheel in the controlling device, holding it firm and stopping the machine instantly.

Having these parts all made, to put up and use the attachment with a machine whose driving-wheel runs parallel to the front of the table, first remove the treadle and connecting-rod from the machine; then, standing in front of the machine, place the attachment at the right-hand end of the machine, at proper distance from the floor, and attach the frame-work of the attachment firmly to the frame of the machine by means of the four clamps, turning the set-screws well home, putting a clamp on each side at the top and bottom; then attach the connecting-rod to the wrist-pin of the driving-wheel, and the crooked end to the crank on the smaller beveled geared wheel; cut a curved slot through the front part of the table large enough to allow free motion to the tube or collar of the stopping and starting device, and put the metal plate over; place the brake-bar under the table in front of the legs, passing the pin through the curved slot, and then screw firmly to the table through the hole in the lever-arm, allowing that portion of the arm bent downward to rest near the outer arm of the curved double pawl, the head or stud of the device being thrown toward the back side of the table in making this adjustment; then pull back the head or stud, locking the machine, pressing upon the head or stud before moving; wind up the machine by means of the crank, and it is ready for use, and starts by simply pressing down the head or stud in the lock and moving it toward the needle-bar or back side of the table.

For other machines whose driving-wheels are at right angles to the front of the machine, remove the treadle and old connecting-rod from the machine, and also remove the small beveled geared wheel from the attachment by taking out the screws which hold the arms, carrying it against the side of the frame, and, after having attached the frame of the attachment to the frame of the machine by means of the four clamps, attach the new connecting-rod to the crank-pin on the lower shaft and wrist-pin of driving-wheel; attach the starting and stopping device as in the other class of machines, and proceed in the same manner for using the attachment as in the other machines.

The improved motive-power attachment is so arranged that it can be easily attached to any sewing-machine, either before or after the use thereof.

What I claim as my invention, and desire to secure by Letters Patent, is—

An improved motive-power attachment for sewing-machines, having a frame-work or attachment carrying geared wheels, and a spring which can be attached to the machine or machines upon which it is to be used by means of metallic clamps and screws; the controlling or regulating power by means of the ratchet-wheel, double curved pawl, and balance-wheel, or equivalent means for that purpose; and the starting and stopping device by means of the spring, stud, lock, and lever, bent to work in connection with the ratchet-wheel, double curved pawl, and balance-wheel, or equivalent means, for the purpose herein set forth and specified.

WARREN R. DUNTON,
*Lieut. U. S. Army.*

Witnesses:
   A. DeLAFFRE, M. D.,
   CHAS. B. S. CARR.